United States Patent
Kim et al.

(10) Patent No.: US 11,205,248 B2
(45) Date of Patent: Dec. 21, 2021

(54) MOBILE TERMINAL

(71) Applicant: LG ELECTRONICS INC., Seoul (KR)

(72) Inventors: Youngkwon Kim, Seoul (KR); Seunghwan Moon, Seoul (KR); Keumsung Hwang, Seoul (KR); Hyundae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 16/802,508

(22) Filed: Feb. 26, 2020

(65) Prior Publication Data
US 2021/0150668 A1    May 20, 2021

(30) Foreign Application Priority Data
Nov. 15, 2019   (KR) .................. 10-2019-0146941

(51) Int. Cl.
  *G06T 5/50* (2006.01)
  *H04W 88/02* (2009.01)
  *G06T 3/40* (2006.01)

(52) U.S. Cl.
  CPC .......... *G06T 3/4053* (2013.01); *G06T 3/4007* (2013.01); *G06T 3/4038* (2013.01); *G06T 5/50* (2013.01); *G06T 2207/20021* (2013.01); *G06T 2207/20084* (2013.01); *G06T 2207/20192* (2013.01); *G06T 2207/20212* (2013.01); *H04W 88/02* (2013.01)

(58) Field of Classification Search
  CPC ....... G06T 3/4053; G06T 3/4007; G06T 5/50; G06T 3/4038; G06T 2207/20084; G06T 2207/20021; G06T 2207/20212; G06T 2207/20192; G06T 1/20; G06T 3/4076; H04W 88/02; H04M 1/72403
  See application file for complete search history.

(56) References Cited

U.S. PATENT DOCUMENTS 5,488,674 A * 1/1996 Burt .......................... G06T 5/50
                                                                      345/639
6,538,249 B1 * 3/2003 Takane ..................... G06T 5/50
                                                                        850/10
(Continued)

*Primary Examiner* — Jitesh Patel
(74) *Attorney, Agent, or Firm* — Lee, Hong, Degerman, Kang & Waimey PC

(57) ABSTRACT

A mobile terminal is provided. The mobile terminal includes at least one processor configured to divide one image into a plurality of partial images, perform first resolution processing on a first partial image among the plurality of partial images, perform second resolution processing on a second partial image partially overlapping the first partial image among the plurality of partial images, perform overlapping processing on an overlapping region of the first partial image and the second partial image by using "first result data by the first resolution processing and second result data by the second resolution processing" in the overlapping region, and display an image obtained by connecting a non-overlapping region of the first partial image on which the first resolution processing is performed, the overlapping region on which the overlapping processing is performed, and a non-overlapping region of the second partial image on which the second resolution processing is performed.

20 Claims, 12 Drawing Sheets

(56) References Cited

U.S. PATENT DOCUMENTS

| | | | |
|---|---|---|---|
| 2007/0097334 A1* | 5/2007 | Damera-Venkata | H04N 9/3147 353/94 |
| 2009/0060284 A1* | 3/2009 | Nagumo | H04N 5/23267 382/107 |
| 2009/0324135 A1* | 12/2009 | Kondo | G06T 3/4038 382/284 |
| 2011/0211120 A1* | 9/2011 | Taniguchi | H04N 9/3102 348/576 |
| 2013/0104016 A1* | 4/2013 | Nonaka | G06F 17/00 715/204 |
| 2015/0093032 A1* | 4/2015 | Nakao | G06K 9/6293 382/195 |
| 2015/0170375 A1* | 6/2015 | Ito | H04N 1/6027 382/167 |
| 2016/0055627 A1* | 2/2016 | Shibata | G06K 9/6212 382/254 |

* cited by examiner

FIG. 7
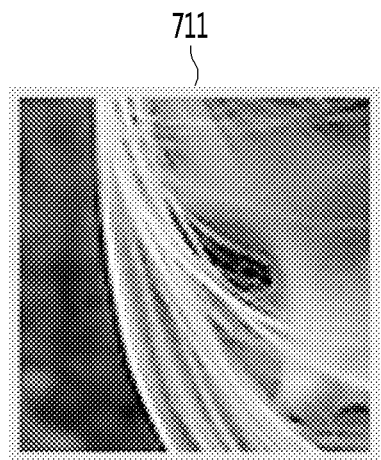 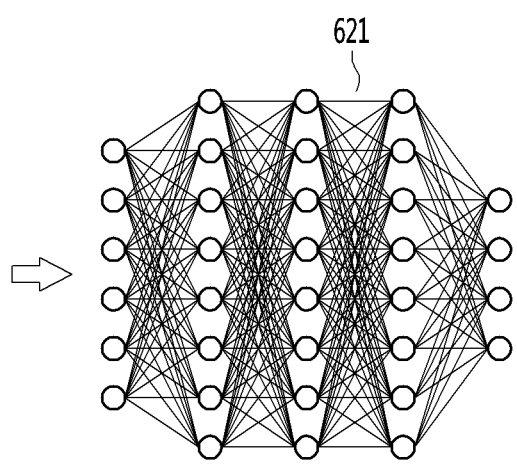
(a)
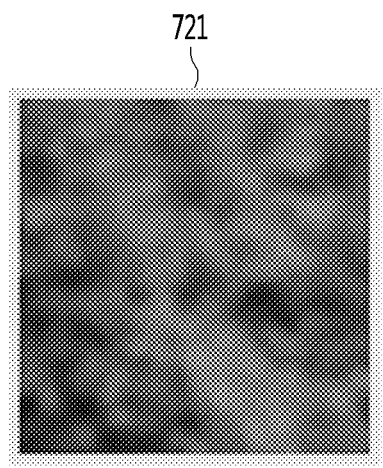 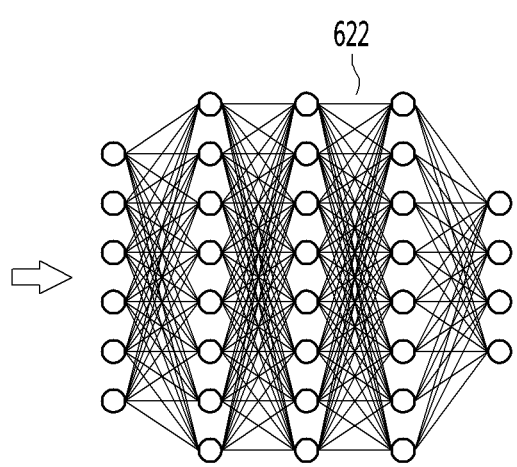
(b)

FIG. 8
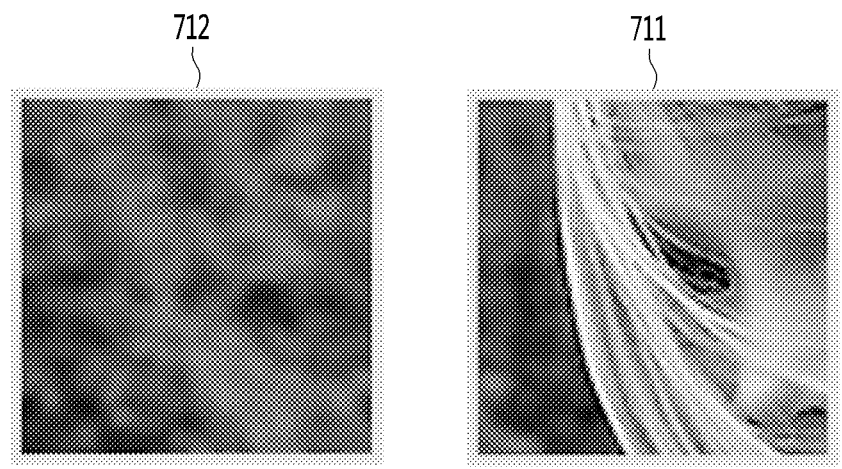
(a)
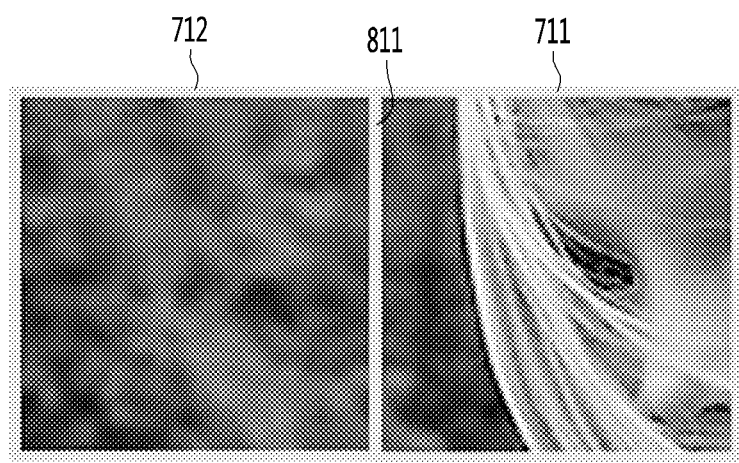
(b)

FIG. 9
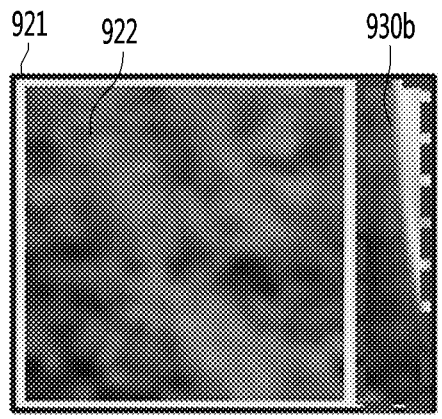
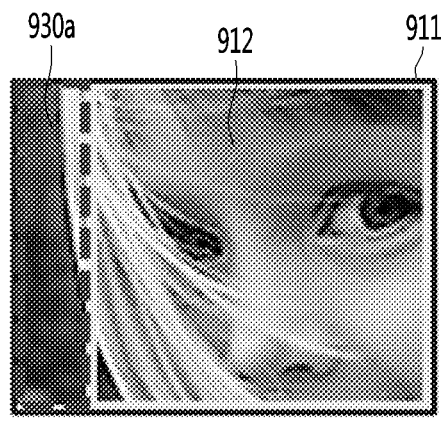
(a)
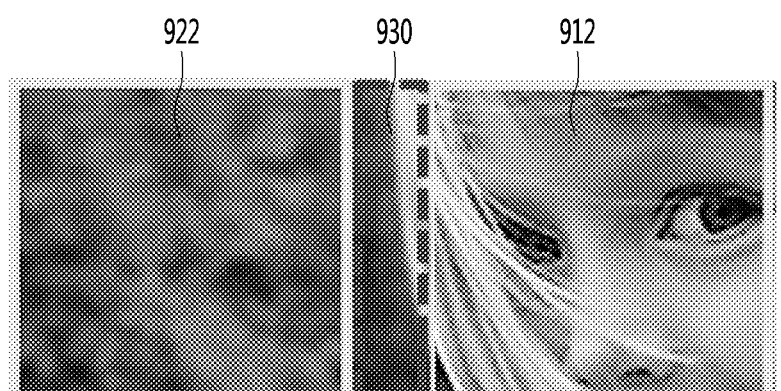
(b)

FIG. 11
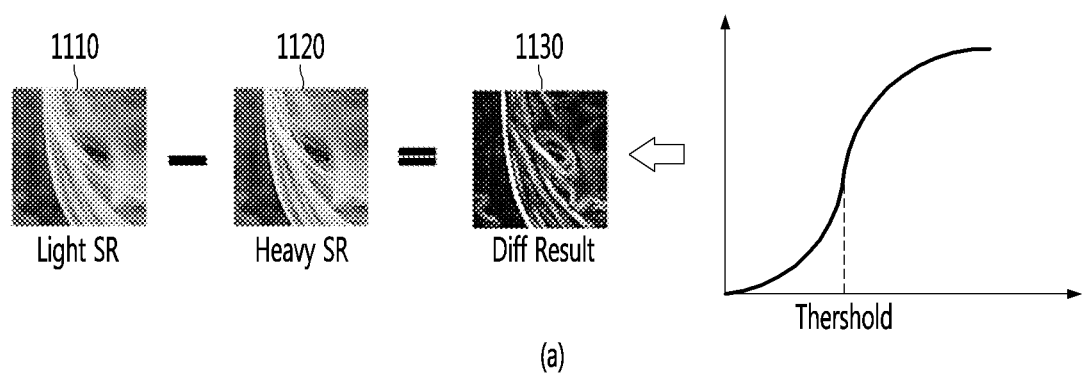
(a)
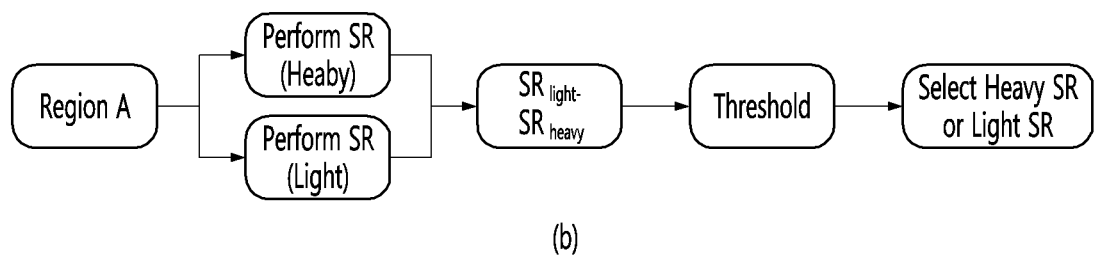
(b)

FIG. 12
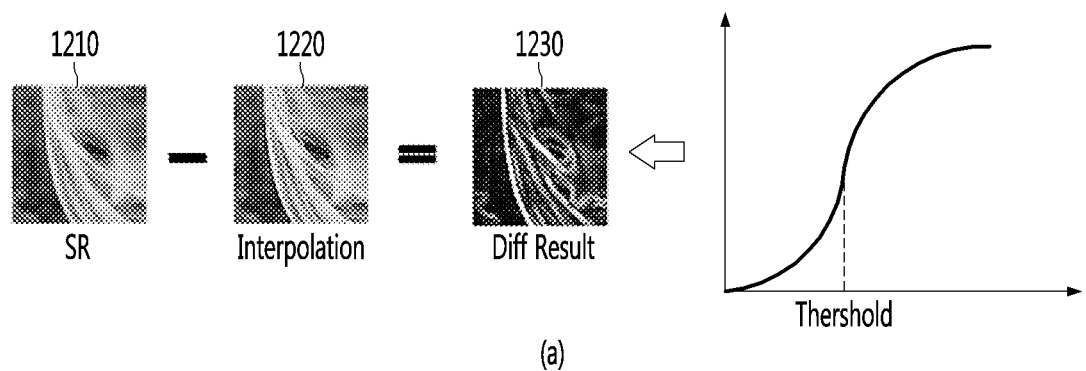
(a)
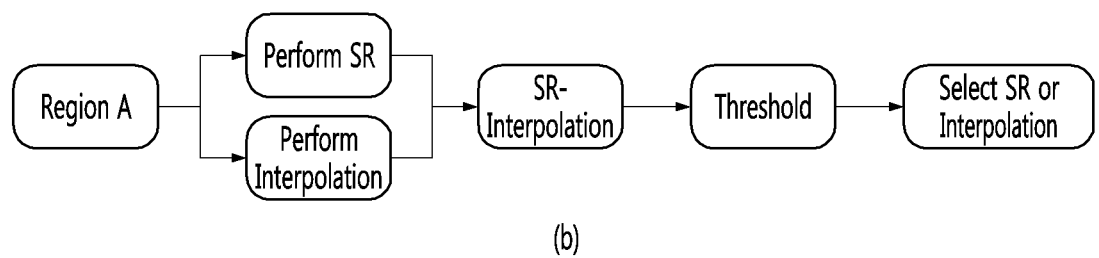
(b)

(a)  (b)

MOBILE TERMINAL

CROSS-REFERENCE TO RELATED APPLICATIONS

Pursuant to 35 U.S.C. § 119(a), this application claims the benefit of earlier filing date and right of priority to Korean Patent Application No. 10-2019-0146941, filed on Nov. 15, 2019, the contents of which are all hereby incorporated by reference herein in their entirety.

BACKGROUND

The present disclosure relates to a mobile terminal that naturally processes a boundary between a plurality of partial images when resolution processing is performed by separating one image into a plurality of partial images.

Artificial intelligence (AI) is one field of computer engineering and information technology for studying a method of enabling a computer to perform thinking, learning, and self-development that can be performed by human intelligence and may denote that a computer imitates an intelligent action of a human.

Also, AI is directly or indirectly associated with the other field of computer engineering without being individually provided. Particularly, at present, in various fields of information technology, an attempt to introduce AI components and use the AI components in solving a problem of a corresponding field is being actively done.

Meanwhile, techniques for perceiving and learning the surrounding situation by using AI and providing information desired by the user in a desired form, or performing an operation or function desired by the user are being actively studied.

An electronic device that provides such various operations and functions may be referred to as an AI device.

Meanwhile, an image processing technology is a technology related to a method for performing specific operations on an image so as to improve image quality or extract specific information from an image.

The image processing technology is a technology that can be widely used in various fields, and is one of the core technologies essentially required in various fields such as autonomous vehicles, security monitoring systems, video communications, and high-definition video transmissions.

With the development of high-resolution image sensors, 5G communication networks, and AI technologies, image processing technologies are also developing. Recently, a technology for converting an image of a low-resolution still image or each frame image of a low-resolution moving image into a high-resolution image using a deep neural network has been attempted.

Currently, super resolution technology, which processes low-resolution images to obtain high-resolution images, mainly uses deep learning technology based on artificial neural networks. Due to the active research and development, various artificial neural networks used in super resolution have been proposed.

Such image processing technologies may be used in display devices of TVs, computers, and mobile terminals.

Meanwhile, mobile terminals such as smart phones have secured portability with small volume and weight, but there is a limitation in that performance is limited for securing portability.

Therefore, the mobile terminal performs image processing by dividing one entire image into a plurality of partial images, individually inputting the plurality of partial images into the artificial neural network, and connecting high-resolution images output from the artificial neural network, instead of inputting one entire image into the artificial neural network.

In this process, however, a boundary between the partial images may become unnatural.

SUMMARY

The present disclosure has been made an effort to solve the above-described problems and provides a mobile terminal that naturally processes a boundary between a plurality of partial images when resolution processing is performed by separating one image into a plurality of partial images.

In one embodiment, a mobile terminal includes a display, at least one memory, and at least one processor configured to divide one image into a plurality of partial images, perform first resolution processing on a first partial image among the plurality of partial images, perform second resolution processing on a second partial image partially overlapping the first partial image among the plurality of partial images, perform overlapping processing on an overlapping region of the first partial image and the second partial image by using "first result data by the first resolution processing and second result data by the second resolution processing" in the overlapping region, and display an image obtained by connecting a non-overlapping region of the first partial image on which the first resolution processing is performed, the overlapping region on which the overlapping processing is performed, and a non-overlapping region of the second partial image on which the second resolution processing is performed.

The details of one or more embodiments are set forth in the accompanying drawings and the description below. Other features will be apparent from the description and drawings, and from the claims.

BRIEF DESCRIPTION OF THE DRAWINGS

FIGS. 7 and 8 are views for describing a boundary problem between partial images.

FIG. 9 is a view for describing a method of making a boundary between partial images natural.

FIGS. 11 and 12 are views for describing another method of selecting a resolution processing method with respect to one partial image.

DETAILED DESCRIPTION OF THE EMBODIMENTS

Figure 1:
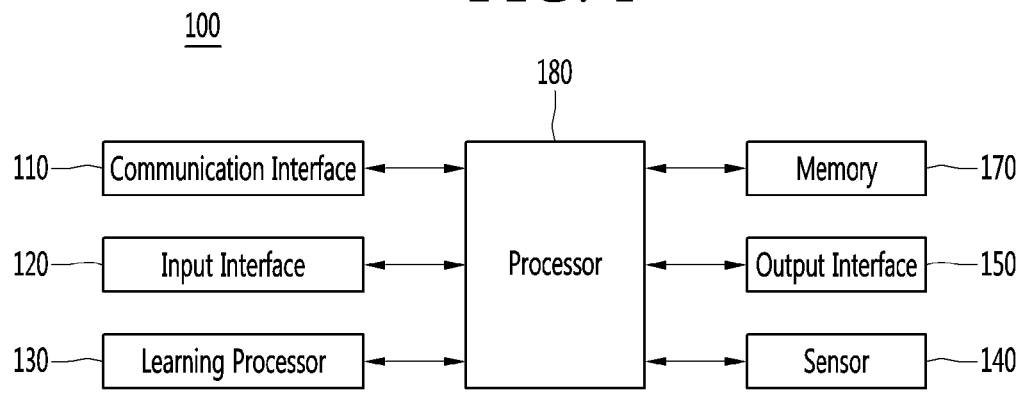
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together.

However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
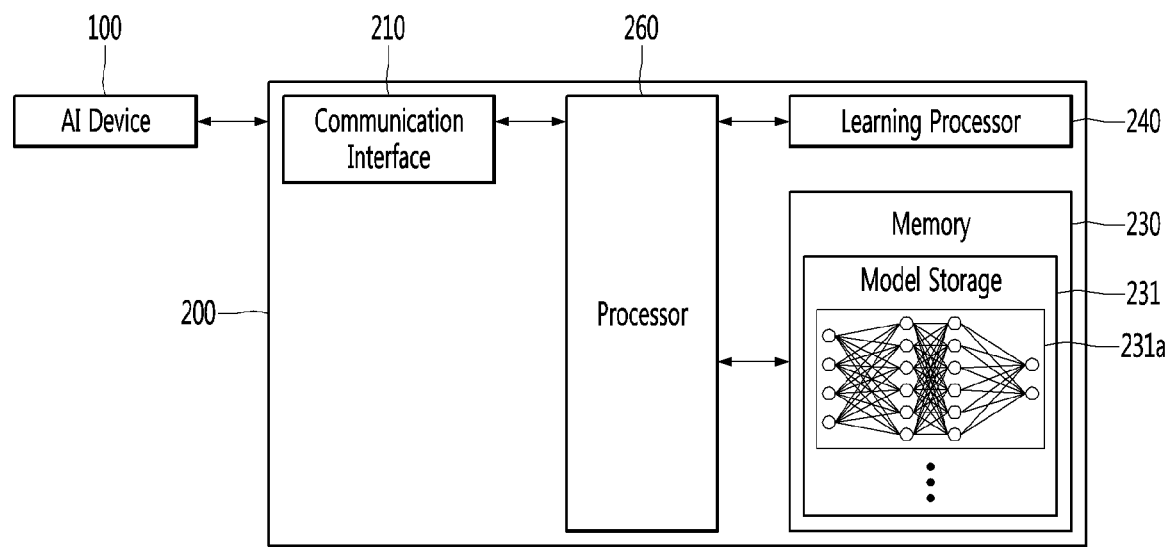
FIG. 2 illustrates an AI server 200 according to an embodiment of the present disclosure.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
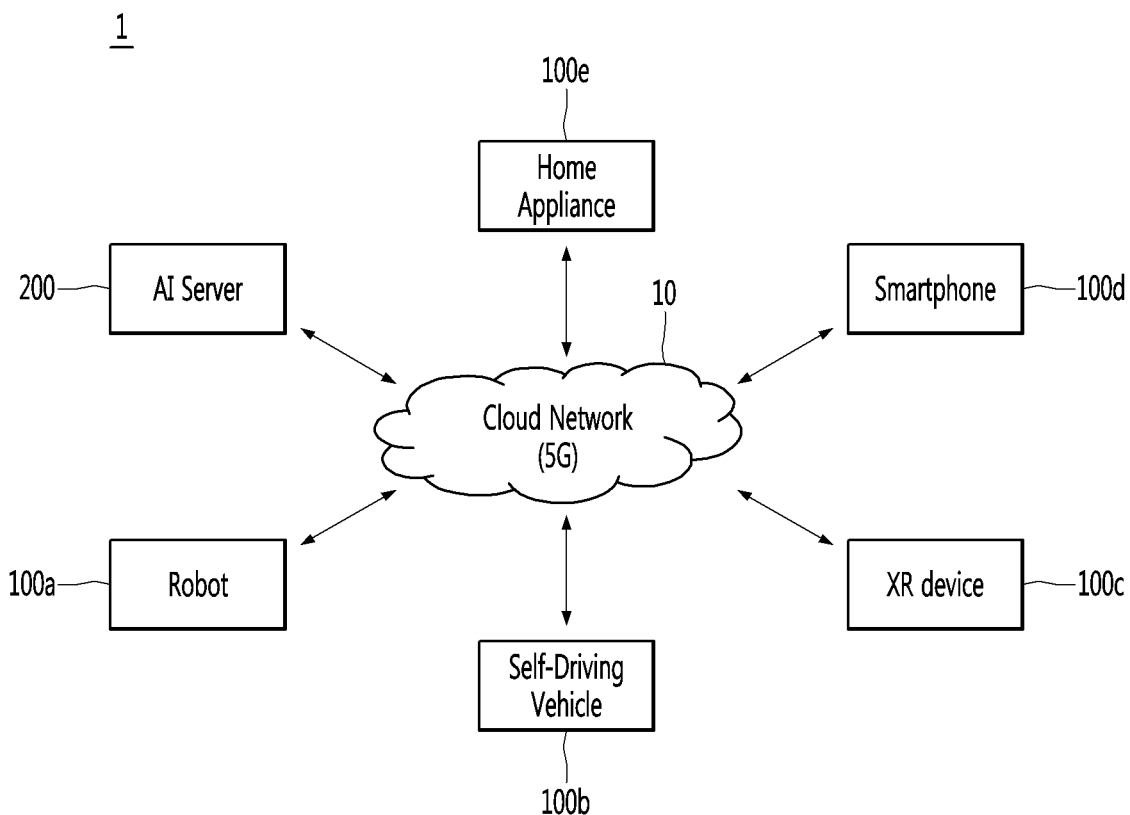
FIG. 3 illustrates an AI system 1 according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driver based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driver such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driver based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Meanwhile, a mobile terminal described below may include all or part of the configuration of the AI device 100 described with reference to FIG. 1, and may perform the function performed by the AI device 100. Therefore, the term "mobile terminal 100" may be used interchangeably with the term "AI device 100."

Also, the term "mobile terminal" may be used interchangeably with the term "AI mobile terminal."

The mobile terminal described herein may include a mobile phone, a smart phone, a digital broadcasting terminal, a personal digital assistant (PDA), a portable multimedia player (PMP), a navigation, a slate PC, a tablet PC, an ultrabook, a wearable device (for example, a smartwatch, a smart glass, or a head mounted display (HMD)), and the like.

Figure 4:
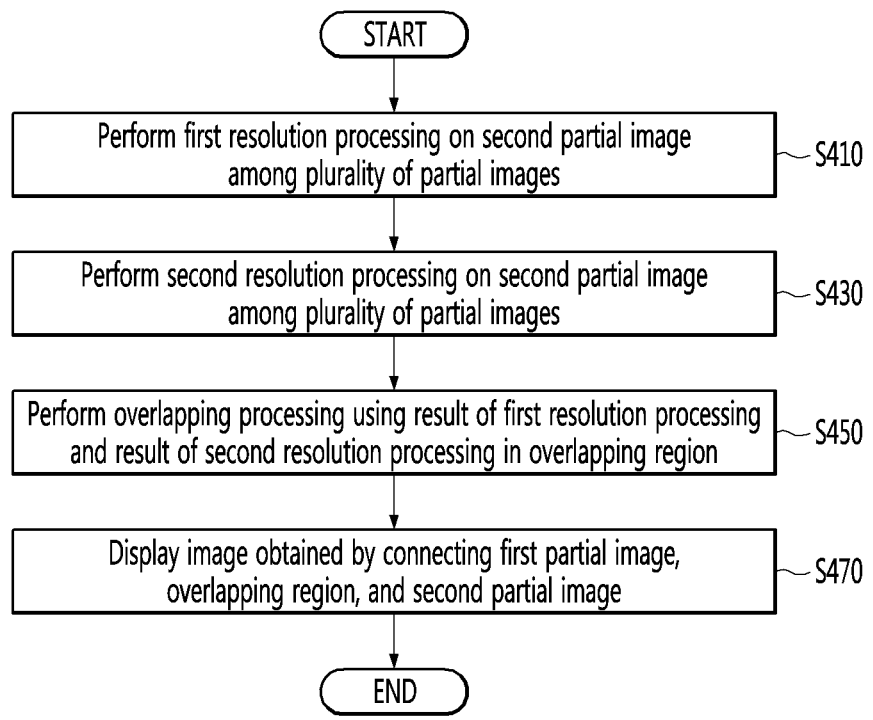
FIG. 4 is a view for describing a method of processing a plurality of partial images according to an embodiment of the present disclosure.

FIG. 4 is a view for describing a method of processing a plurality of partial images according to an embodiment of the present disclosure.

Referring to FIG. 4, the method of processing the plurality of partial images includes: performing first resolution processing on a first partial image among the plurality of partial images (S410); performing second resolution processing on a second partial image partially overlapping the first partial image among the plurality of partial images (S430); performing overlapping processing on an overlapping region of the first partial image and the second partial image by using "first result data by the first resolution processing and second result data by the second resolution processing" in the overlapping region(S450); and displaying an image obtained by connecting a non-overlapping region of the first partial image on which the first resolution processing is performed, the overlapping region on which the overlapping processing is performed, and a non-overlapping region of the second partial image on which the second resolution processing is performed (S470).

Figure 5:
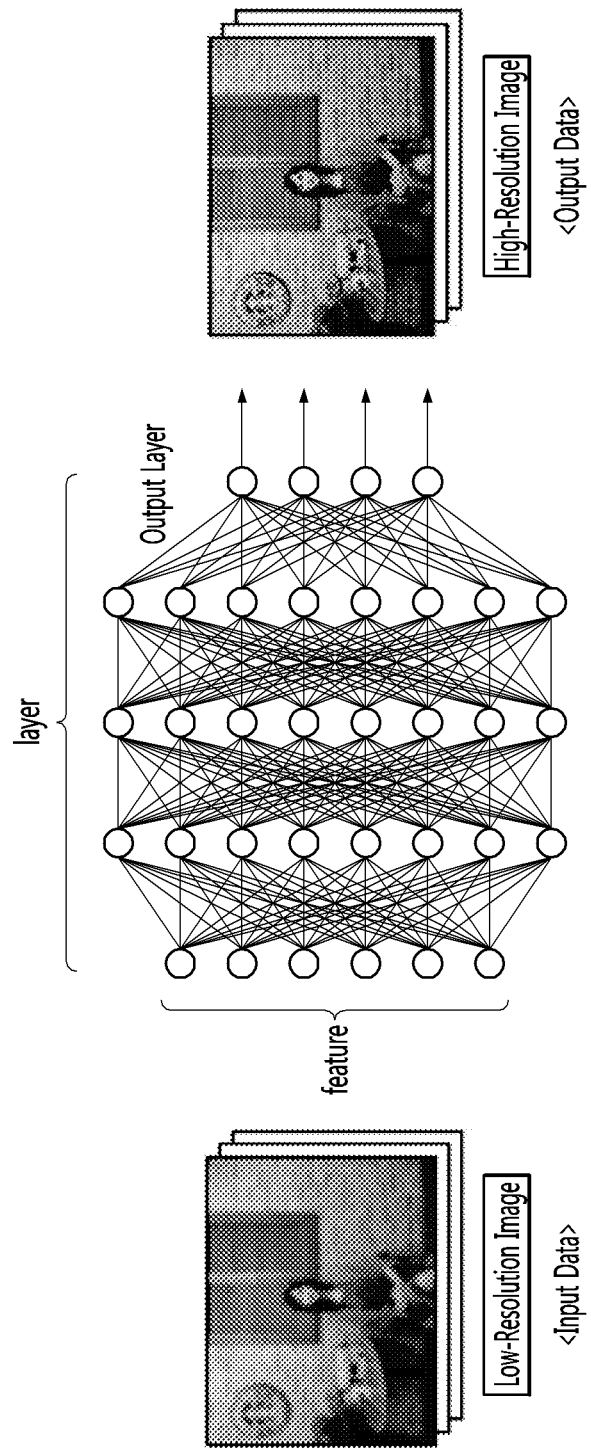
FIG. 5 is a view for describing super resolution processing, which is one resolution processing method.

FIG. 5 is a view for describing super resolution processing, which is one resolution processing method.

The processor of the mobile terminal 100 may perform resolution processing. As the method for performing the resolution processing, the super resolution processing will be described.

Currently, in super resolution (SR) technology for obtaining high-resolution images by processing low-resolution images, deep learning technology based on artificial neural networks may be used. Due to the active research and development, various artificial neural networks used in super resolution have been proposed.

The mobile terminal 100 may store or include one or more SR models to which the AI technology is applied. For example, the SR model to which the AI technology is applied may be or include various learning models such as deep neural networks or other types of machine learning models. Hereinafter, the term "super resolution model" may be used interchangeably with the term "SR model."

The SR model is a neural network for image processing and may be a learning model trained to process an image of a still image or a frame image of a moving image so as to output a high-resolution moving image when a low-resolution moving image is input.

The SR model may include an input layer, a hidden layer, and an output layer. The number of input nodes is determined according to the number of features. As the number of nodes increases, the complexity or dimensionality of the neural network increases.

In addition, as the number of hidden layers increases, the complexity or dimensionality of the neural network increases.

The number of features, the number of input nodes, the number of hidden layers, and the number of nodes in each layer may be determined by a neural network designer. As the complexity increases, the processing time increases, but better performance may be achieved.

If an initial neural network structure is designed, a learning apparatus 200 may train the neural network using training data. In order to implement the neural network for improving frame resolution, a high-resolution original image and a low-resolution version of the image are required. Low-resolution images corresponding to the high-resolution original images may be prepared by collecting the high-resolution original images and then performing distortion processing such as blurring, down sampling or noise injection such as bicubic down sampling, or the like on the corresponding images.

Training data capable of training the neural network for improving image resolution is prepared by labeling the high-resolution original images corresponding to the low-resolution images.

If the neural network is trained through a large amount of training data by supervised learning, a neural network model for image processing capable of outputting the high-resolution image when the low-resolution image is input may be generated.

Meanwhile, the processing speed and processing performance of the neural network for image processing may be in a trade-off relationship. A designer can generate neural networks for various super resolution models having different processing speeds and processing performances by changing the initial structure of the neural network. A super resolution model that can be applied to electronic devices having different performances can be generated.

Meanwhile, the learning apparatus 200 may generate an SR model and transmit the generated SR model to the mobile terminal 100.

The SR model may be implemented in hardware, software, or a combination of hardware and software. If all or part of the SR model is implemented in software, one or more instructions constituting the SR model may be stored in the memory of the mobile terminal 100.

Meanwhile, the processor of the mobile terminal 100 may perform super resolution processing on the image or the partial image.

The super resolution processing may refer to processing for providing the low-resolution image to the SR model trained to predict the high-resolution image using the low-resolution image, and obtaining the high-resolution image output by the SR model based on the low-resolution image.

Meanwhile, the term "super resolution processing" may be used interchangeably with the term "SR processing."

Meanwhile, the learning apparatus may generate a plurality of super resolution models having different performances due to different complexities or structures.

In detail, the learning apparatus may generates a first SR model by training an artificial neural network having a first structure using training data, and generate a second SR model by training an artificial neural network having a second structure using training data.

The first structure and the second structure may be different from each other. The different structures may mean that at least one of the number of hidden layers or the number of filters (or channels) is different.

For example, the artificial neural network having the first structure may have a larger number of hidden layers and a larger number of filters (or channels) than the artificial neural network having the second structure.

The first SR model generated by training the artificial neural network having the first structure may be referred to as a heavy SR model, and the second SR model generated by training the artificial neural network having the second structure may be referred to as a light SR model.

Therefore, the number of hidden layers of the heavy SR model may be larger than the number of hidden layers of the light SR model, and the number of filters (channels) of the heavy SR model may be larger than the number of filters (channels) of the light SR model.

The heavy SR model has a longer processing time than the light SR models, but can provide improved performance. In addition, the light SR model has a shorter processing time than the heavy SR model, but can provide relatively low performance.

For example, the heavy SR model can infer edges of an object more clearly, more naturally, and more precisely than the light SR model. In a non-edge region, the heavy SR model can produce a more natural image than the light SR model. However, a conspicuous difference between the heavy SR model and the light SR model may occur at the edge.

Meanwhile, in the present specification, that the processor performs heavy SR processing on the image (or partial image) means that the image (or partial image) is provided to the heavy SR model and the result data output by the heavy SR model is obtained.

Also, in the present specification, that the processor performs light SR processing on the image (or partial image) means that the image (or partial image) is provided to the light SR model and the result data output by the light SR model is obtained.

Next, interpolation processing, which is one resolution processing method, will be described.

Interpolation refers to averaging other pixels so as to make a new pixel. Nearest neighbor interpolation, bilinear interpolation, and bicubic interpolation may be used as the interpolation method.

In other words, unlike the SR processing for inferring a new pixel based on input data, the interpolation processing is a method of calculating a new pixel using pixel values of neighboring pixels.

Therefore, the interpolation processing has a shorter processing time than the SR processing, but can provide relatively low performance.

For example, the SR processing can restore the edges of the object more clearly, more naturally, and more precisely than the interpolation processing. In a non-edge region, the SR processing may implement a more natural image than the interpolation processing, but a conspicuous difference between the SR processing and the interpolation processing may occur at the edge.

Meanwhile, in the present specification, that the processor performs resolution processing on the image (or partial image) may mean that the processor performs SR processing on the image (or partial image), the processor performs heavy SR processing on the image (or partial image), the processor performs light SR processing on the image (or partial image), and the processor performs interpolation processing on the image (or a partial image).

Figure 6:
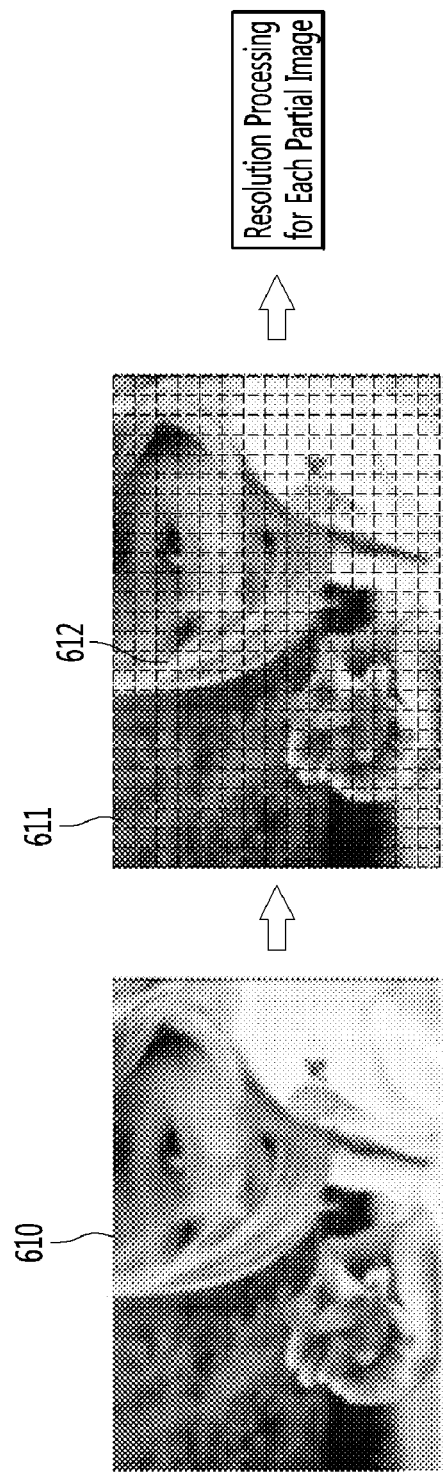
FIG. 6 is a view for describing a method of dividing one image into a plurality of partial images and performing resolution processing on the plurality of partial images.

FIG. 6 is a view for describing a method of dividing one image into a plurality of partial images and performing resolution processing on the plurality of partial images.

Mobile terminals such as smart phones have secured portability with small volume and weight, but there is a limitation in that performance is limited for securing portability.

Therefore, the mobile terminal performs image processing by dividing one entire image into a plurality of partial images, individually inputting the plurality of partial images into the artificial neural network, and connecting high-resolution images output from the artificial neural network, instead of inputting one entire image into the artificial neural network.

In detail, the processor may divide one image 610 (one entire image) into a plurality of partial images 611, 612, etc., instead of inputting one image 610 (one entire image). The processor may individually perform resolution processing on the plurality of partial images and connect the plurality of individually resolution-processed images to generate and display the entire resolution-processed image.

FIGS. 7 and 8 are views for describing a boundary problem between partial images.

The processor may perform resolution processing on the plurality of partial images divided from one image by using two or more resolution processing methods.

In detail, the processor may detect an edge with respect to one image 610 (the entire image) and determine a partial image processing method based on the amount of the edge of the object for each region.

The object is a concept opposite to the background and may refer to those, such as persons or things, to be highlighted and provided to the user.

Therefore, the processor may perform resolution processing having a large amount of computation and a long processing time but higher performance with respect to a partial image having relatively more edges. On the other hand, the processor may perform resolution processing having a small amount of computation and a short processing time but lower performance with respect to a partial image having relatively fewer edges.

For example, if there exist edges of an object above a predetermined value in a first partial image 711, the processor may perform heavy SR processing on the first partial image 711 by inputting the first partial image 711 divided from one image to the heavy SR model. On the other hand, if there exist edges of an object below a predetermined value in a second partial image 712, the processor may perform light SR processing on the second partial image 712 by inputting the second partial image 712 divided from one image to the light SR model.

As another example, if there exist edges of an object above a predetermined value in the first partial image 711, the processor may perform SR processing on the first partial image 711 by inputting the first partial image 711 divided from one image to the SR model. On the other hand, if there exist edges of an object below a predetermined value in the second partial image 712, the processor may perform interpolation processing on the second partial image 712 divided from one image.

Meanwhile, the processor may detect an edge with respect to one image 610 (the entire image) and determine a partial image processing order and a resolution processing method based on the amount of the edge of the object for each region.

For example, the processor may performs heavy SR processing on a partial image whose edge exists larger than or equal to a first value, perform light SR processing on a partial image whose edge exists smaller than the first value and larger than a second value, and then perform interpolation processing on a partial image whose edge exists smaller than a third value.

Meanwhile, the edge detection of the object may be performed by various known edge detection methods.

Meanwhile, referring to FIG. 8, the first partial image 711 and the second partial image 712 are adjacent to each other.

If a plurality of resolution-processed partial images are connected to generate a single resolution-processed entire image, the first partial image 711 and the second partial image 712 may be connected to each other.

Meanwhile, if different resolution processing is performed on the first partial image 711 and the second partial image 712, a boundary 811 between the first partial image 711 and the second partial image 712 may become unnatural.

FIG. 9 is a view for describing a method of making a boundary between partial images natural.

The processor may divide one image into a plurality of partial images.

In this case, the processor may divide one image into a plurality of partial images so that all or part of partial images have a region overlapping the adjacent partial image.

In detail, FIG. 9A illustrates a first partial image 911 and a second partial image 921 among the plurality of partial images. The first partial image 911 and the second partial image 921 are partial images adjacent to each other.

Meanwhile, the first partial image 911 may partially overlap the second partial image 921.

In detail, a partial region 930*a* of the first partial image 911 and a partial region 930*b* of the second partial image 921 may be the same.

In this case, the partial region 930*a* of the first partial image 911 or the partial region 930*b* of the second partial image 921 may be referred to as an overlapping region 930.

Meanwhile, the processor may perform first resolution processing on the first partial image 911 among the plurality of partial images and may perform second resolution processing on the second partial image 921 partially overlapping the first partial image among the plurality of partial images.

The first resolution processing and the second resolution processing may be different resolution processing.

In detail, the first resolution processing may be heavy SR processing, and the second resolution processing may be light SR processing.

In more detail, the processor may detect the edge component included in the first partial image 911. If the edge component included in the first partial image 911 is larger than a reference value, the processor may perform heavy SR processing on the first partial image 911.

Also, the processor may detect the edge component included in the second partial image 921. If the edge component included in the second partial image 921 is smaller than the reference value, the processor may perform light SR processing on the second partial image 921.

That is, the first partial image 911 on which the heavy SR processing is performed may include more edge components than the second partial image 921 on which the light SR processing is performed.

Meanwhile, the processor may perform heavy SR processing on the first partial image 911 by providing the first partial image 911 to the heavy SR model and obtaining result data.

Also, the processor may perform light SR processing on the second partial image by providing the second partial image 921 to the light SR model and obtaining result data.

Meanwhile, the output data from the heavy SR model may include result data for the non-overlapping region 912 in the first partial image 911 and result data for the overlapping region 930a in the first partial image 911.

Also, the output data from the light SR model may include result data for the non-overlapping region 922 in the second partial image 921 and result data for the overlapping region 930b in the second partial image 921.

The processor may display an image of the non-overlapping region 912 by using the result data for the non-overlapping region 912 in the first partial image 911. Also, the processor may display an image of the non-overlapping region 922 by using the result data for the non-overlapping region 922 in the second partial image 921.

In this case, the result data for the non-overlapping region 912 in the first partial image 911 is the result data output from the heavy SR model, and the result data for the non-overlapping region 922 in the second partial image 921 is the result data output from the light SR model. Therefore, the non-overlapping region 912 in the first partial image 911 may be displayed more clearly and precisely than the non-overlapping region 922 in the second partial image 921.

On the other hand, two result data exist in the overlapping region 930. One result data is first result data output by the heavy SR model with respect to the overlapping region 930a in the first partial image 911, and the other result data is second result data output by the light SR model with respect to the overlapping region 930b in the second partial image 921.

In this case, the processor may perform overlapping processing on the overlapping region 930 by using "first result data by first resolution processing (heavy SR processing) and second result data by second resolution processing (light SR processing)" in the overlapping region 930 of the first partial image 911 and the second partial image 921.

The processor may perform overlapping processing on the overlapping region 930 by generating new result data in which the first result data by the first resolution processing (heavy SR processing) and the second result data by the second resolution processing (light SR process) are combined. In this case, the processor may perform overlapping processing on the overlapping region by assigning a first weight to the first result data by the first resolution processing (heavy SR processing) in the overlapping region 930, assigning a second weight to the second result data by the second resolution processing (light SR processing) in the overlapping region 930, and combining the first result data to which the first weight is assigned and the second result data to which the second weight is assigned. The sum of the first weight and the second weight may be 1, and the first weight and the second weight may not be 1.

For example, the processor may assign a weight of 0.5 to the first result data and a weight of 0.5 to the second result data. The processor may generate new result data for the overlapping region 930 by combining the first result data to which the weight of 0.5 is assigned and the second result data to which the weight of 0.5 is assigned, and display an image of the overlapping region 930 by using the new result data.

That is, according to the present disclosure, the overlapping region is created between the first partial image and the second partial image, and two result data obtained by different resolution processing are combined in the overlapping region, thereby preventing a problem in that the boundary becomes unnatural when partial images are connected.

Meanwhile, the first result data is the first result data output by the heavy SR model with respect to the overlapping region 930a, and the second result data is the second result data output by the light SR model with respect to the overlapping region 930b.

In this case, the first weight assigned to the first result data may be larger than the second weight assigned to the second result data.

For example, the processor may assign a weight of 0.8 to the first result data and a weight of 0.2 to the second result data. The processor may generate new result data for the overlapping region 930 by combining the first result data to which the weight of 0.8 is assigned and the second result data to which the weight of 0.2 is assigned, and display an image of the overlapping region 930 by using the new result data.

If the first result data is used, a clearer, more natural and precise image can be realized than the second result data. The first result data and the second result data are already secured in the overlapping region 930. Therefore, according to the present disclosure, a higher weight is assigned to the first result data, thereby implementing a clear image for the overlapping region while preventing the problem in that the boundary becomes unnatural when the partial images are connected.

Figure 10:
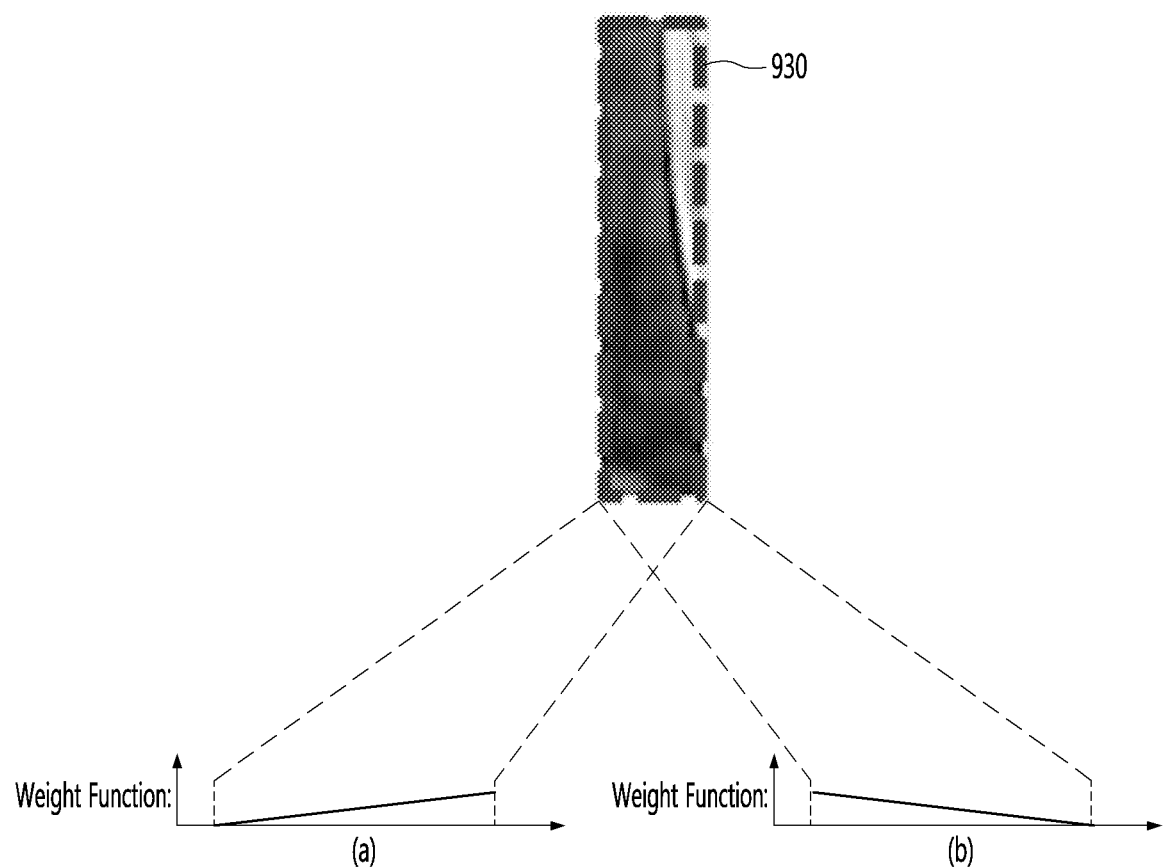
FIG. 10 is a view for describing another method of assigning a weight.

FIG. 10 is a view for describing another method of assigning a weight.

Referring to FIG. 10a, the first weight assigned to the first result data in the overlapping region 930 may increase toward a portion closer to the non-overlapping region of the first partial image. Also, referring to FIG. 10b, the second weight assigned to the second result data in the overlapping region 930 may increase toward a portion closer to the non-overlapping region of the second partial image.

In detail, if the first partial image and the second partial image are horizontally arranged, the first weight assigned to the first result data may increase toward a column closer to the non-overlapping region of the first partial image, and may decrease toward a column closer to the non-overlapping region of the first partial image. Also, if the first partial image and the second partial image are horizontally arranged, the second weight assigned to the second result data may increase toward a column closer to the non-overlapping region of the second partial image, and may decrease toward a column closer to the non-overlapping region of the first partial image.

Also, if the first partial image and the second partial image are vertically arranged, the first weight assigned to the first result data may increase toward a row closer to the non-overlapping region of the first partial image, and may decrease toward a row closer to the non-overlapping region of the second partial image. Also, if the first partial image and the second partial image are vertically arranged, the second weight assigned to the second result data may increase toward a row closer to the non-overlapping region of the second partial image, and may decrease toward a row closer to the non-overlapping region of the first partial image. The sum of the first weight and the second weight may be maintained as 1.

For example, at the boundary between the overlapping region 930 and the non-overlapping region 912 of the first partial image 911, the first weight assigned to the first result data may be 1, and the second weight assigned to the second result data may be 0. Also, the first weight assigned to the first result data may decrease toward a portion farther from the non-overlapping region 912 of the first partial image 911 (toward a portion closer to the non-overlapping region 922 of the second partial image 921). Also, the second weight assigned to the second result data may increase toward a portion farther from the non-overlapping region 912 of the first partial image 911 (toward a portion closer to the non-overlapping region 922 of the second partial image 921). At the boundary between the overlapping region 930 and the non-overlapping region 922 of the first partial image 921, the first weight assigned to the first result data may be 0, and the second weight assigned to the second result data may be 1.

As described above, according to the present disclosure, the partial images can be connected more naturally by changing the weight assigned according to the distance from the partial image.

Meanwhile, the method of performing the heavy SR processing on the first partial image, performing the light SR processing on the second partial image, and processing the overlapping region has been described above.

This method can also be applied between SR processing and interpolation processing.

In detail, the processor may perform first resolution processing on the first partial image 911 among the plurality of partial images and may perform second resolution processing on the second partial image 921 partially overlapping the first partial image among the plurality of partial images.

The first resolution processing and the second resolution processing may be different resolution processing.

In detail, the first resolution processing may be SR processing, and the second resolution processing may be interpolation processing.

In more detail, the processor may detect the edge component included in the first partial image 911. If the edge component included in the first partial image 911 is larger than a reference value, the processor may perform SR processing on the first partial image 911.

Also, the processor may detect the edge component included in the second partial image 921. If the edge component included in the second partial image 921 is smaller than the reference value, the processor may perform interpolation processing on the second partial image 921.

That is, the first partial image 911 on which the SR processing is performed may include more edge components than the second partial image 921 on which the interpolation processing is performed.

Meanwhile, the processor may perform SR processing on the first partial image 911 by providing the first partial image 911 to the SR model and obtaining result data.

Also, the processor may perform interpolation processing on the second partial image by processing the second partial image 921 by various interpolation methods such as nearest neighbor interpolation, bilinear interpolation, or bicubic Interpolation and generating result data.

The processor may perform overlapping processing on the overlapping region by using "first result data by SR processing and second result data by interpolation processing" in the overlapping region of the first partial image and the second partial image.

In this case, the processor may perform overlapping processing on the overlapping region by assigning a first weight to the first result data by the SR processing in the overlapping region, assigning a second weight to the second result data by the interpolation processing in the overlapping region, and combining the first result data to which the first weight is assigned and the second result data to which the second weight is assigned.

In this case, the first partial image 911 on which the SR processing is performed may include more edge components than the second partial image on which the interpolation processing is performed.

Also, the first weight assigned to the first result data may be larger than the second weight assigned to the second result data.

Also, the first weight assigned to the first result data increases toward a portion closer to the non-overlapping region of the first partial image, and the second weight assigned to the second result data may increase toward a portion closer to the non-overlapping region of the second partial image.

Meanwhile, if the resolution processing and the overlapping processing are completed on a plurality of images divided from one image, the processor may connect the plurality of processed partial images to generate a resolution-processed entire image and display the generated entire image.

The first partial image and the second partial image will be described as an example. The processor may display an image in which the non-overlapping region 912 of the first partial image 911 on which the first resolution processing is performed, the overlapping region 930 on which the overlapping processing is performed, and the non-overlapping region 922 of the second partial image 921 on which the second resolution processing is performed are connected.

The first partial image 911 and the second partial image 921 may be connected to other partial images in the same manner. In this case, the processor may display an entire image in which the "non-overlapping region 912 of the first partial image 911, the overlapping region 930 on which the overlapping processing is performed, and the non-overlapping region of the second partial image 921 on which the second resolution processing" and other partial images are connected.

FIGS. 11 and 12 are views for describing another method of selecting a resolution processing method with respect to one partial image.

FIG. 11 is a view for describing a method of selecting any one of heavy SR processing and light SR processing with respect to one partial image.

The processor may perform specific SR processing on the partial image. The meaning of performing the specific SR processing may include selecting result data processed by any one method of result data SR-processed by two methods.

In detail, the processor may perform heavy SR processing on the first partial image by providing the first partial image to the heavy SR model to obtain first result data 1120, providing the first partial image to the light SR model to obtain second result data 1110, and selecting the first result data 1120 among the first result data 1120 and the second result data 1110.

In this case, the processor may select one of the first result data 1120 and the second result data 1110 based on a difference between the first result data 1120 and the second result data 1110.

In detail, as described above, mainly due to the characteristics of the super resolution where the restoration is performed on the edge, the performance difference between the heavy SR model and the light SR model may be more prominent at the edge of the object. That is, a large difference between the first result data output by the heavy SR model and the second result data output by the light SR model may mean that more edge components are included in the partial image.

In addition, a clearer image can be provided to the user when regions having more edges are processed by the processing method having higher performance.

Therefore, if a difference 1130 between the first result data 1120 output by the heavy SR model and the second result data 1110 output by the light SR model is greater than a threshold value, the processor may perform the heavy SR processing on the first partial image by selecting the first result data 1120 among the first result data 1120 and the second result data 1110.

On the other hand, if the difference 1130 between the first result data 1120 output by the heavy SR model and the second result data 1110 output by the light SR model is less than the threshold value, the processor may perform the light SR processing on the first partial image by selecting the second result data 1110 among the first result data 1120 and the second result data 1110.

Also, the SR processing may be performed on the second partial image in the same manner.

In detail, the processor may perform light SR processing on the second partial image by providing the second partial image to the heavy SR model to obtain first result data, providing the second partial image to the light SR model to obtain second result data, and selecting the second result data among the first result data and the second result data.

In more detail, if a difference between the first result data and the second result data is less than a threshold value, the processor may perform the light SR processing on the second partial image by selecting the second result data among the first result data and the second result data.

Meanwhile, if the heavy SR processing is performed on the first partial image and the light SR processing is performed on the second partial image, the processor may perform overlapping processing on the overlapping region by using the "first result data by the first resolution processing and the second result data by the second resolution processing" in the overlapping region of the first partial image and the second partial image, and may display an image in which the non-overlapping region of the first partial image on which the first resolution processing is performed, the overlapping region on which the overlapping processing is performed, and the non-overlapping region of the second partial image on which the second resolution processing is performed are connected.

FIG. 12 is a view for describing a method of selecting any one of SR processing and interpolation processing with respect to one partial image.

The processor may perform specific SR processing on the partial image. The meaning of performing the specific SR processing may include selecting result data processed by any one method of result data SR-processed by two methods.

In detail, the processor may perform SR processing on the first partial image by providing the first partial image to the SR model to obtain first result data 1220, processing the first partial image through the interpolation method to obtain second result data 1210, and selecting the first result data 1220 among the first result data 1220 and the second result data 1210.

In this case, the processor may select one of the first result data 1220 and the second result data 1210 based on a difference between the first result data 1220 and the second result data 1210.

In detail, as described above, mainly due to the characteristics of the super resolution where the restoration is performed on the edge, the performance difference between the SR processing and the general interpolation processing may be more prominent at the edge of the object. That is, a large difference between the first result data output by the SR model and the second result data generated by the interpolation method may mean that more edge components are included in the partial image.

Therefore, if the difference 1230 between the first result data 1220 output by the SR model and the second result data 1210 generated by the interpolation method is greater than the threshold value, the processor may perform the SR processing on the first partial image by selecting the first result data 1220 among the first result data 1220 and the second result data 1210.

On the other hand, if the difference 1230 between the first result data 1220 output by the SR model and the second result data 1210 generated by the interpolation method is less than the threshold value, the processor may perform the interpolation processing on the first partial image by selecting the second result data 1210 among the first result data 1220 and the second result data 1210.

Also, the processor may perform the SR processing or the interpolation processing on the second partial image in the same manner.

Meanwhile, if the SR processing is performed on the first partial image and the interpolation processing is performed on the second partial image, the processor may perform overlapping processing on the overlapping region by using the "first result data by the first resolution processing and the second result data by the second resolution processing" in the overlapping region of the first partial image and the second partial image, and may display an image in which the non-overlapping region of the first partial image on which the first resolution processing is performed, the overlapping region on which the overlapping processing is performed, and the non-overlapping region of the second partial image on which the second resolution processing is performed are connected.

As such, if the method of processing partial images is selected based on the difference between the result data, the storage capacity and transmission traffic of the processed entire image may be reduced and the region (e.g., object) of interest may be highlighted and provided to the user.

Figure 13:
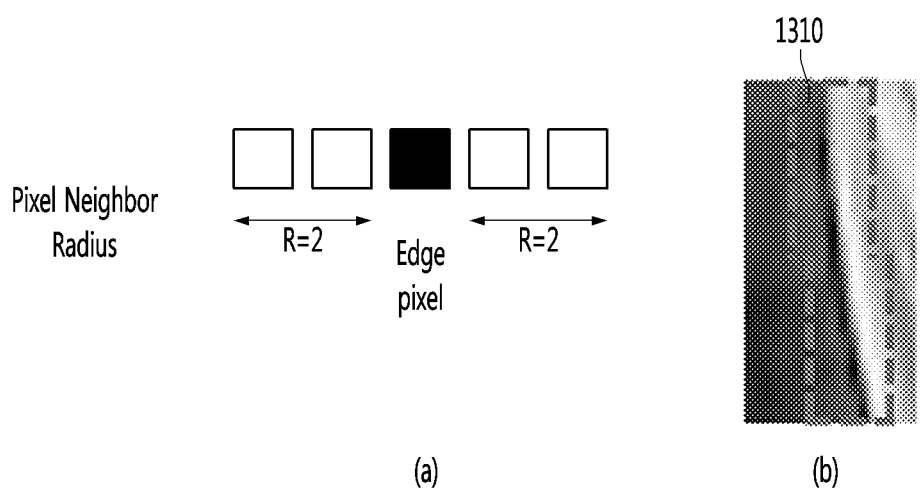
FIG. 13 is a view for describing a method of performing SR processing in an edge peripheral region within one partial image and performing interpolation processing on a region other than the edge peripheral region.

FIG. 13 is a view for describing a method of performing SR processing on an edge peripheral region in one partial image and performing interpolation processing on a region other than the edge peripheral region.

In the above embodiment, the same resolution processing is performed on the entire partial image. However, in the embodiment described with reference to FIG. 13, resolution processing having higher performance may be performed on the boundary in the partial image and the region around the boundary.

In detail, the processor may obtain the first result data by providing the partial image to the SR model and obtain the second result data by processing the partial image by the interpolation method.

The processor may detect the edge existing in the partial image.

As one method of detecting the edge, the processor may detect the edge component in the partial image based on the difference between the first result data and the second result data.

In detail, mainly due to the characteristics of the super resolution where the restoration is performed on the edge, the performance difference between the SR processing and the general interpolation processing may be more prominent at the edge of the object. Therefore, the processor may detect, as the edge, pixels in which the difference between the first result data and the second result data in the partial image is greater than or equal to the reference value.

Meanwhile, detecting the edge using the difference between the first result data and the second result data is merely one embodiment for detecting the edge, and various known methods can be used to detect the edge.

Meanwhile, the processor may determine an SR processing region 1310. The SR processing region may include a region where the edge is positioned and a peripheral region of the edge.

In this case, the processor may determine the size of the peripheral region based on the thickness of the edge.

For example, if the thickness of the edge is a first thickness, the processor may determine four pixels around the edge as the peripheral region, and if the thickness of the edge is a second thickness, the processor may determine 16 pixels around the edge as the peripheral region.

The processor may perform SR processing on the determined SR processing region 1310. Also, the processor may perform interpolation processing on the region other than the determined SR processing area 1310.

In detail, the first result data and the second result data are already generated and stored in the memory.

In this case, the processor may perform SR processing on the SR processing region 1310 by selecting first result data in the SR processing region 1310.

Also, the processor may perform interpolation processing on the region other than the SR processing region 1310 by selecting second result data in the region other than the SR processing area 1310.

The processor may generate a partial image by connecting the SR-processed SR processing region 1310 and the region other than the interpolated SR processing region. Also, the processor may generate and display an entire image in which the generated partial image and other partial images generated in the same manner are connected.

As described above, according to the present disclosure, SR processing is performed on the region in which the edge exists, thereby preventing a step phenomenon (phenomenon in which a pixel simply expands or does not connect smoothly) that occurs when interpolation is applied to an edge. Also, according to the present disclosure, since the interpolation processing is performed on the region in which the edge does not exist, the storage capacity and transmission traffic of the entire image may be reduced and the region (e.g., object) of interest may be highlighted and provided to the user.

Meanwhile, the image resolution processing method includes: dividing one image into a plurality of partial images; performing first resolution processing on a first partial image among the plurality of partial images; performing second resolution processing on a second partial image partially overlapping the first partial image among the plurality of partial images; performing overlapping processing on an overlapping region of the first partial image and the second partial image by using "first result data by the first resolution processing and second result data by the second resolution processing" in the overlapping region; and displaying an image obtained by connecting a non-overlapping region of the first partial image on which the first resolution processing is performed, the overlapping region on which the overlapping processing is performed, and a non-overlapping region of the second partial image on which the second resolution processing is performed.

According to the present disclosure, the overlapping region between the first partial image and the second partial image, and two result data obtained by different resolution processing are combined in the overlapping region, thereby preventing the boundary from becoming unnatural when connecting the partial images.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include the processor 180 of the terminal.

Therefore, the detailed description is intended to be illustrative, but not limiting in all aspects. It is intended that the scope of the present disclosure should be determined by the rational interpretation of the claims as set forth, and the modifications and variations of the present disclosure come within the scope of the appended claims and their equivalents.

What is claimed is:

1. A mobile terminal comprising:
    a display;
    at least one memory; and
    at least one processor configured to:
        divide one image into a plurality of partial images;
        perform first resolution processing on a first partial image among the plurality of partial images;
        perform second resolution processing on a second partial image partially overlapping the first partial image among the plurality of partial images;
        perform overlapping processing on an overlapping region of the first partial image and the second partial image by using "first result data by the first resolution processing and second result data by the second resolution processing" in the overlapping region; and
        display an image obtained by connecting a non-overlapping region of the first partial image on which the first resolution processing is performed, the overlapping region on which the overlapping processing is performed, and a non-overlapping region of the second partial image on which the second resolution processing is performed.

2. The mobile terminal according to claim 1, wherein the first resolution processing is heavy super resolution (SR) processing, and
wherein the second resolution processing is light SR processing.

3. The mobile terminal according to claim 2, wherein the at least one processor is configured to:
assign a first weight to the first result data by the heavy SR processing on the overlapping region;
assign a second weight to the second result data by the light SR processing on the overlapping region; and
perform overlapping processing on the overlapping region by combining the first result data to which the first weight is assigned and the second result data to which the second weight is assigned.

4. The mobile terminal according to claim 3, wherein the first partial image on which the heavy SR processing is performed includes more edge components than the second partial image on which the light SR processing is performed.

5. The mobile terminal according to claim 3, wherein the first weight assigned to the first result data is larger than the second weight assigned to the second result data.

6. The mobile terminal according to claim 3, wherein the first weight assigned to the first result data increases toward a portion closer to the non-overlapping region of the first partial image, and
wherein the second weight assigned to the second result data increases toward a portion closer to the non-overlapping region of the second partial image.

7. The mobile terminal according to claim 2, wherein the at least one processor is configured to:
perform the heavy SR processing on the first partial image by providing the first partial image to a heavy SR model and obtaining third result data outputted by the heavy SR model, and perform the light SR processing on the second partial image by providing the second partial image to a light SR model and obtaining fourth result data outputted by the light SR model.

8. The mobile terminal according to claim 2, wherein the at least one processor is configured to perform the heavy SR processing on the first partial image by providing the first partial image to a heavy SR model to obtain fifth result data, providing the first partial image to a light SR model to obtain sixth result data, and selecting the fifth result data among the fifth result data and the sixth result data.

9. The mobile terminal according to claim 8, wherein the at least one processor is configured to select the fifth result data among the fifth result data and the sixth result data if a difference between the fifth result data and the sixth result data is larger than a threshold value.

10. The mobile terminal according to claim 1, wherein the at least one processor is configured to perform the light SR processing on the second partial image by providing the second partial image to a heavy SR model to obtain seventh result data, providing the second partial image to a light SR model to obtain eighth result data, and selecting the eighth result data among the seventh result data and the eighth result data.

11. The mobile terminal according to claim 1, wherein the first resolution processing is SR processing, and
wherein the second resolution processing is interpolation processing.

12. The mobile terminal according to claim 11, wherein the at least one processor is configured to perform the SR processing on the first partial image by providing the first partial image to an SR model to obtain ninth result data, performing interpolation processing on the first partial image to obtain tenth result data, and selecting the ninth result data among the ninth result data and the tenth result data.

13. The mobile terminal according to claim 12, wherein the at least one processor is configured to select the ninth result data among the ninth result data and the tenth result data if a difference between the ninth result data and the tenth result data is larger than a threshold value.

14. An image resolution processing method comprising:
dividing one image into a plurality of partial images;
performing first resolution processing on a first partial image among the plurality of partial images;
performing second resolution processing on a second partial image partially overlapping the first partial image among the plurality of partial images;
performing overlapping processing on an overlapping region of the first partial image and the second partial image by using "first result data by the first resolution processing and second result data by the second resolution processing" in the overlapping region; and
display an image obtained by connecting a non-overlapping region of the first partial image on which the first resolution processing is performed, the overlapping region on which the overlapping processing is performed, and a non-overlapping region of the second partial image on which the second resolution processing is performed.

15. The image resolution processing method according to claim 14, wherein the first resolution processing is heavy super resolution (SR) processing, and
wherein the second resolution processing is light SR processing.

16. The image resolution processing method according to claim 15, wherein the performing of the overlapping processing on the overlapping region comprises:
assigning a first weight to the first result data by the heavy SR processing on the overlapping region;
assigning a second weight to the second result data by the light SR processing on the overlapping region; and
performing overlapping processing on the overlapping region by combining the first result data to which the first weight is assigned and the second result data to which the second weight is assigned.

17. The image resolution processing method according to claim 16, wherein the first partial image on which the heavy SR processing is performed includes more edge components than the second partial image on which the light SR processing is performed.

18. The image resolution processing method according to claim 16, wherein the first weight assigned to the first result data is larger than the second weight assigned to the second result data.

19. The image resolution processing method according to claim 16, wherein the first weight assigned to the first result data increases toward a portion closer to the non-overlapping region of the first partial image, and
wherein the second weight assigned to the second result data increases toward a portion closer to the non-overlapping region of the second partial image.

20. The image resolution processing method according to claim 15, wherein the performing of the first resolution processing on the first partial image comprises performing the heavy SR processing on the first partial image by providing the first partial image to a heavy SR model and obtaining third result data outputted by the heavy SR model, and wherein the performing of the second resolution processing on the second partial image partially overlapping the first partial image comprises performing the light SR processing on the second partial image by providing the second partial image to a light SR model and obtaining fourth result data outputted by the light SR model.

* * * * *